United States Patent [19]

Müller et al.

[11] Patent Number: 4,874,812

[45] Date of Patent: Oct. 17, 1989

[54] SINGLE-COMPONENT POLYRETHANE COATING MASS

[75] Inventors: Günter Müller, Thun, Switzerland; Rolf Nagel, Baden-Baden, Fed. Rep. of Germany; Jurg Stahli, Steffisburg, Switzerland

[73] Assignee: Metallogal AG, Bern, Switzerland

[21] Appl. No.: 162,926

[22] Filed: Mar. 2, 1988

[30] Foreign Application Priority Data

Mar. 9, 1987 [EP] European Pat. Off. ........ 87103328.8

[51] Int. Cl.$^4$ .............................................. C08L 75/04

[52] U.S. Cl. ..................................... 524/712; 528/59; 528/67

[58] Field of Search ...................... 524/712; 528/59, 67

[56] References Cited

U.S. PATENT DOCUMENTS 4,758,622 7/1988 Gosselin ................................ 528/67

Primary Examiner—Maurice J. Welsh
Attorney, Agent, or Firm—Dykema Gossett

[57] ABSTRACT

A single-component polyurethane coating mass, applicable in a dry layer up to 2000 microns thick, containing a mixture of 50 to 67 wt. % of an aromatic di- or polyisocyanate as the isocyanate component.

10 Claims, No Drawings

SINGLE-COMPONENT POLYRETHANE COATING MASS

TECHNICAL FIELD

The invention relates to a moisture-hardening coating mass applicable in a dry layer having a thickness up to 2000 microns, i.e. a single-component polyurethane coating mass.

BACKGROUND OF THE INVENTION

Coating masses, in which aliphatic di- or polyisocyanates are used as the isocyanate component, are particularly suitable for the production of mechanically and/or climatically resistant coatings on objects made of wood, concrete, steel, etc. Compared with two-component polyurethane coating masses, they have the advantage that they harden through reaction with the moisture contained in the ambient air, i.e., it is not necessary to add a separately supplied hardener prior to their use. Up until now, however, it has only been possible to apply them to the substrate in relatively thin dry layers up to 100 microns thick, because bubbles tended to form in thicker layers and/or the coating adhered poorly to the substrate and/or the hardened layer exhibited buckling and/or cracking and/or opacity. However, the protection provided against mechanical and/or atmospheric influences by such thin coatings is often not as good or not as durable as desired.

SUMMARY OF THE INVENTION

It is the object of the invention to provide a single-component polyurethane coating mass which can be applied in one operation to a substrate in film thicknesses up to 2000 microns without any of the above-mentioned disadvantages occurring.

Up to now, aliphatic di- or polyisocyanates were used as the isocyanate component in the single-component coating masses.

Surprisingly, it has now been discovered that, using a single component polyurethane coating mass containing a mixture of 30 to 70 vol. % aliphatic and 70 to 30 vol. % cycloaliphatic polyisocyanate as the isocyanate component, it is possible to apply coatings having a dry film thickness up to 2000 microns without the above disadvantages occurring.

DESCRIPTION OF THE PREFERRED EMBODIMENTS

In accordance with the present invention, there is provided a single-component polyurethane coating mass which includes as the isocyanate component a mixture of from about 50 wt. % to about 67 wt. % of an aliphatic di-of polyisocyanate and from about 33 wt. % to about 50 wt. % of an cycloaliphatic di- or polyisocyanate. In other words, in forming the coating masses in accordance with the present invention, the aforementioned inventive mixture of isocyanates is utilized.

In one embodiment, a single-component polyurethane coating mass is provided which includes about 15 to about 23 wt. % hexamethylene diisocyanate prepolymer, where the NCO-content is about 2.7%; about 7 to about 15 wt. % isophorone diisocyanate prepolymer, where NCO-content is about 11.5%; about 0.0 to about 1.0 wt. % montmorillonites as an anti-settling agent; about 0.2 to about 3.0 wt. % highly-dispersed silica as an anti-settling agent; about 3 to about 7 wt. % trichloroethyl phosphate; about 0.1 to about 1.0 wt. % co-polymer of butyl acrylate/vinylisobutyl ether; about 3 to about 10 wt. % dioctyl distannous laurate; about 0.1 to about 0.4 wt. % magnesium silicate hydrate; about 15 to about 40 wt. % barium sulphate; about 2 to about 15 wt. % chromium oxide green; about 0 to about 1.0 wt. % salt of unsaturated polyamine amides and high molecular acid esters; and about 5 to about 15 wt. % solvent mixture.

The coating masses according to the invention can be applied in a dry film thickness up to 2000 microns at temperatures between −10 degrees C and +45 degrees C at relative humidities of up to 85% and more. Drying takes place rapidly and without any problems so that the coating can be handled within a very short time. The applied coating is extremely elastic and possesses a high degree of UV-resistance, even while still unhardened, and the coating mass does not run on surfaces inclined at up to 30 degrees. The surface of the hardened layer is very smooth so that very little mechanical abrasion occurs. The resistance to chemicals and solvents as well as to light and UV radiation is good, even in the unhardened state.

EXAMPLES

The following examples illustrate the coating mass according to the invention and are not intended to in any way limit the scope of the present invention.

| | Example 1 | Example 2 | Example 3 |
|---|---|---|---|
| Hexamethylene diisocyanate prepolymer (NCO = 2.7%) wt. % | 18.20 | 17.50 | 18.70 |
| Isophorone diisocyanate prepolymer (NCO = 11.5%) wt. % | 7.95 | 7.00 | 9.70 |
| Montmorillonites as anti-settling agents wt. % | 0.50 | — | 0.40 |
| Highly dispersed silica as an anti-settling agent wt. % | 0.25 | 2.65 | 2.30 |
| Trichloroethyl phosphate wt. % | 4.55 | 3.50 | 4.70 |
| Co-polymer of butyl acrylate/vinylisobutyl ether wt. % | 0.50 | 0.50 | 0.25 |
| Urethane bisoxazolidine wt. % | 5.30 | 5.30 | 5.20 |
| Dioctyl distannous laurate wt. % | 0.20 | 0.20 | 0.20 |
| Magnesium silicate hydrate wt. % | 6.50 | 9.40 | 9.20 |
| Barium sulphate wt. % | 20.70 | 36.00 | 35.00 |
| Iron oxide red wt. % | 11.50 | — | 5.60 |
| Chromium oxide green wt. % | — | 5.00 | — |
| Calcium ferrite (corrosion inhibitor) wt. % | 12.50 | — | — |
| Salt of unsaturated polyamine amides and high molecular acid esters wt. % | 0.25 | — | 0.50 |
| Mixture of solvents* wt. % | 11.10 | 12.95 | 8.25 |
| Total Wt. % | 100.00 | 100.00 | 100.00 |
| Analysis | | | |
| Hexamethylene diisocyanate prepolymer (wt. % of isocyanate mixture) | 69.6 | 71.4 | 65.9 |
| Isophorone diisocyanate prepolymer (wt. % of isocyanate mixture) | 30.4 | 28.6 | 34.1 |
| Solids content, wt. % | 88.9 | 87.05 | 91.75 |
| Binder/pigment ratio | 33.8:66.2 | 21.7:67.3 | 36.3:63.7 |

*The mixture of solvents may consist of aromatic and/or aliphatic hydrocarbons and esters, for example:

| | | | | | |
|---|---|---|---|---|---|
| "Solvesso 100" | 50 | 25 | 70 | 60 | 25 |
| Xylene | 50 | 25 | 5 | 10 | 25 |
| White Spirit | — | 25 | 5 | — | — |
| n-butyl acetate | — | 25 | 20 | 30 | 50 |

The formulation given in Example 1 is used, for example, for the outer coating of steel; it gives good corrosion protection at dry film thicknesses of approximately 350 microns, and it can be applied in only one process. In addition, this formulation can also be combined with Example 2, e.g.:
1×200 microns coating mass of Example 1
1×150 microns coating mass of Example 2

The formulation given in Example 2 is suitable for coating concrete although before applying this coating the concrete must be pretreated with a single-component polyurethane-based penetrating stopper. The dry film thicknesses of the formulation according to Example 2 may, for example, be 600 microns thick, applied in 2 coatings each 300 microns thick.

The formulation of Example 3 is particularly suitable for the internal coating of pipelines (e.g. oil or gas pipelines). In this case, the coating can be applied by means of a pig, because the thixotrophic characteristics of the coating are such that it will not run.

What is claimed is:

1. A single-component polyurethane coating mass applicable in a dry layer up to 2000 microns thick having a non-aromatic isocyanate component, said isocyanate component comprising:
   a mixture containing about 50 to about 67 wt. % of an isocyanate selected from the group consisting of aliphatic di- and polyisocyanate and about 33 to about 50 wt. % of an isocyanate selected from the group consisting of cycloaliphatic di- and polyisocyanates.

2. A single-component polyurethane coating mass consisting essentially of:
   about 15 to about 23 wt. % hexamethylene diisocyanate prepolymer, where NCO-content is about 2.7%;
   about 7 to about 15 wt. % isophorone diisocyanate prepolymer, where NCO-content is about 11.5%;
   about 0.0 to about 1.0 wt. % montmorillonites as an anti-settling agent;
   about 0.2 to about 3.0 wt. % highly-dispersed silica as an anti-settling agent;
   about 3 to about 7 wt. % trichloroethyl phosphate;
   about 0.1 to about 1.0 wt. % co-polymer of butyl acrylate/vinylisobutyl ether;
   about 3 to about 10 wt. % dioctyl distannous laurate;
   about 0.1 to about 0.4 wt. % magnesium silicate hydrate;
   about 15 to about 40 wt. % barium sulphate;
   about 2 to about 15 wt. % chromium oxide green;
   about 0 to about 1.0 wt. % salt of unsaturated polyamine amides and high molecular acid esters; and
   about 5 to about 15 wt. % solvent mixture.

3. A protective film for coating articles which comprises a polyurethane coating, said polyurethane coating including a non-aromatic isocyanate component, said isocyanate component being a mixture of from about 50 wt. % to about 67 wt. % of an isocyanate selected from the group consisting of aliphatic diisocyanate and aliphatic polyisocyanate, and from about 33 wt. % to about 50 wt. % of an isocyanate selected from the group consisting of cycloaliphatic diisocyanate and cycloaliphatic polyisocyanate.

4. The protective film for coating articles recited in claim 3, wherein said film has a thickness up to about 2000 microns.

5. A single-component polyurethane coating mass applicable in a dry layer up t 2000 microns thick characterized by an absence of aromatic isocyanates and comprising from about 22 to about 38 percent by weight of an aliphatic di- or polyisocyanate component, said isocyanate component including from about 33 to about 50 percent by weight cycloaliphatic isocyanate, said cycloaliphatic isocyanate being selected from the group consisting of cycloaliphatic di- and polyisocyanates.

6. The coating mass recited in claim 5, wherein said cycloaliphatic isocyanate is isophorone diisocyanate.

7. a protective polyurethane film for coating articles, said polyurethane film characterized by an absence of aromatic isocyanates and comprising from about 22 to about 33 percent by weight of a di- or polyisocyanate component, said isocyanate component including from about 33 to about 50 percent by weight cycloaliphatic isocyanate, said cycloaliphatic isocyanate being selected from the group consisting of cycloalphatic di- and polyisocyanates.

8. The protective film recited in claim 7, wherein said cycloaliphatic isocyanate is isophorone diisocyanate.

9. The coating mass recited in claim 6, further including urethane bisoxazolidine.

10. The protective film recited in claim 8, further including urethane bisoxazolidine.

* * * * *

UNITED STATES PATENT AND TRADEMARK OFFICE
CERTIFICATE OF CORRECTION

PATENT NO. : 4,874,812
DATED : October 17, 1989
INVENTOR(S) : Gunter Muller, Rolf Nagel, and Jurg Stahli It is certified that error appears in the above-identified patent and that said Letters Patent is hereby corrected as shown below:

In the title, change "POLYRETHANE" to --POLYURETHANE--.

Column 4, line 22, change "t" to --to--.

Signed and Sealed this

Ninth Day of October, 1990

*Attest:*

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,874,812

DATED : October 17, 1989

INVENTOR(S) : Günter Müller, Rolf Nagel, and Jürg Stähli

It is certified that error appears in the above-identified patent and that said Letters Patent is hereby corrected as shown below:

ON TITLE PAGE:
Change the name of the third inventor from "Jurg Stahli" to --Jürg Stähli--.

Column 1, line 54, change "di-of" to --di-or--.

Column 4, line 32, change "a" to --A--.

Signed and Sealed this

Twelfth Day of May, 1992

Attest:

DOUGLAS B. COMER

*Attesting Officer*       Acting Commissioner of Patents and Trademarks